(12) United States Patent  
Saito et al.

(10) Patent No.: US 11,724,277 B2  
(45) Date of Patent: Aug. 15, 2023

(54) PAINT MIST REMOVING APPARATUS AND COATING FACILITY

(71) Applicant: TRINITY INDUSTRIAL CORPORATION, Toyota (JP)

(72) Inventors: Ryota Saito, Toyota (JP); Shigeki Fujiwara, Toyota (JP)

(73) Assignee: TRINITY INDUSTRIAL CORPORATION, Toyota (JP)

(*) Notice: Subject to any disclaimer, the term of this patent is extended or adjusted under 35 U.S.C. 154(b) by 71 days.

(21) Appl. No.: 17/161,957

(22) Filed: Jan. 29, 2021

(65) Prior Publication Data

US 2021/0260614 A1 Aug. 26, 2021

(30) Foreign Application Priority Data

Feb. 25, 2020 (JP) .................. 2020-028998

(51) Int. Cl.
*B05B 14/43* (2018.01)
*B01D 46/00* (2022.01)

(52) U.S. Cl.
CPC .......... *B05B 14/43* (2018.02); *B01D 46/0005* (2013.01); *B01D 2258/0258* (2013.01)

(58) Field of Classification Search
None
See application file for complete search history.

(56) References Cited

U.S. PATENT DOCUMENTS

| 4,225,328 A | 9/1980 | Stiehl |
| 4,401,445 A | 8/1983 | Browning |
| 9,321,070 B2 | 4/2016 | Link et al. |
| 9,545,645 B2 * | 1/2017 | Thomason .............. B05B 14/43 |
| 10,272,468 B2 * | 4/2019 | Vijay ........................ B05B 5/10 |
| 10,456,726 B2 * | 10/2019 | Bratten .................. B01D 45/08 |
| 10,596,504 B2 | 3/2020 | Wieland et al. |

(Continued)

FOREIGN PATENT DOCUMENTS

| CN | 104968440 A | 10/2015 |
| CN | 106457296 A | 2/2017 |

(Continued)

OTHER PUBLICATIONS

Oct. 28, 2022 Office Action issued in Chinese Patent Application No. 202110122029.7.

(Continued)

*Primary Examiner* — Jethro M. Pence
(74) *Attorney, Agent, or Firm* — Oliff PLC (57) ABSTRACT

A paint mist removing apparatus includes: a duct through which air containing paint mist passes; an element fit part provided at the duct, the element fit part being fitted with a filter element including a filter part configured to remove the paint mist and a filter case housing the filter part, the filter case having a case exit from which all air taken in from a case entrance of the filter case is caused to exit through the filter part; an frame-like projection projecting from an inner surface of the duct and abutting on an entire circumference of an opening edge of the case exit of the filter case; and a duct side-surface opening being open at a side surface of the duct and normally closed by a door member, the duct side-surface opening being open when the filter element is set in and out from the element fit part.

18 Claims, 10 Drawing Sheets

(56) References Cited

U.S. PATENT DOCUMENTS

| | | | |
|---|---|---|---|
| 10,646,891 B2 | 5/2020 | Zebisch et al. | |
| 2014/0202332 A1 | 7/2014 | Link et al. | |
| 2014/0366798 A1 | 12/2014 | Katefidis et al. | |
| 2015/0157972 A1* | 6/2015 | Bratten | B01D 46/446 96/397 |
| 2015/0375251 A1 | 12/2015 | Roeckle | |
| 2016/0023231 A1 | 1/2016 | Schmeinck et al. | |
| 2016/0288036 A1* | 10/2016 | Wieland | B05B 14/43 |
| 2017/0095825 A1 | 4/2017 | Manabe et al. | |
| 2018/0207669 A1* | 7/2018 | Zebisch | B05B 16/40 |
| 2018/0311695 A1 | 11/2018 | Saito et al. | |
| 2019/0076869 A1 | 3/2019 | Frohlich et al. | |
| 2020/0179853 A1 | 6/2020 | Wieland et al. | |

FOREIGN PATENT DOCUMENTS

| | | |
|---|---|---|
| CN | 107921456 A | 4/2018 |
| CN | 108043162 A | 5/2018 |
| CN | 108698067 A | 10/2018 |
| DE | 10 2008 029 052 A1 | 12/2009 |
| DE | 102013002041 A1 | 8/2014 |
| DE | 102013011107 A1 | 8/2014 |
| DE | 102017116663 A1 | 1/2019 |
| JP | S50-099956 A | 8/1975 |
| JP | S51-086541 A | 7/1976 |
| JP | S59-069174 A | 4/1984 |
| JP | H07-313825 A | 12/1995 |
| JP | 2001-300370 A | 10/2001 |
| JP | 2011-000562 A | 1/2011 |
| JP | 2014-527462 A | 10/2014 |
| JP | 2016-518956 A | 6/2016 |
| JP | 2016-155051 A | 9/2016 |
| JP | 2016-538118 A | 12/2016 |
| JP | 6096771 B2 | 3/2017 |
| JP | 2018-531777 A | 11/2018 |
| JP | 2018183715 A | 11/2018 |
| WO | 2013013780 A1 | 1/2013 |

OTHER PUBLICATIONS

May 10, 2022 Office Action issued in Chinese patent Application No. 202110122029.7.

U.S. Appl. No. 16/881,176, filed May 22, 2020 in the name of Ryota Saito et al.

Oct. 9, 2020 Extended European Search Report issued in European Patent Application No. 20178937.7.

Feb. 9, 2021 Office Action issued in Japanese Patent Application No. 2019-114010.

Aug. 18, 2021 Office Action issued in Chinese Patent Application No. 202010541930.3.

Mar. 8, 2022 Office Action issued in U.S. Appl. No. 16/881,176.

Jan. 12, 2022 Office Action issued in Chinese Patent Application No. 202010541930.3.

Mar. 15, 2023 Office Action issued in Chinese Patent Application No. 202110122029.7.

* cited by examiner

PAINT MIST REMOVING APPARATUS AND COATING FACILITY

BACKGROUND OF THE INVENTION

(1) Field of the Invention

The present disclosure relates to a paint mist removing apparatus which includes a filter housed in a duct so as to remove paint mist from air passing through the duct, and to a coating facility including the paint mist removing apparatus.

(2) Description of Related Art

A conventionally known paint mist removing apparatus of this kind uses, for example, a filter which is made up of: a quadrangular frame to be fitted inside a duct; and a paper or sponge membrane set in the frame (for example, see JP 2001-300370 A, FIG. 2, paragraph [0017]). Other conventional paint mist removing apparatus includes: a spatial frame having a rectangular parallelepiped structure set in and out from a duct; and a plurality of filters each having a container structure, which filters being mounted having their respective openings oriented in the upstream direction (for example, see U.S. Pat. No. 4,225,328 B (FIGS. 3, 4, 8)).

SUMMARY OF THE INVENTION

With the conventional paint mist removing apparatuses, when replacing the filter, paint tends to scatter from the used filter and the filter replacement work is troublesome. Accordingly, there are demands for a paint mist removing apparatus and a coating facility with which the filter replacement work is facilitated.

A paint mist removing apparatus of the present disclosure for solving the above-mentioned problem includes: a duct through which air containing paint mist passes; an element fit part provided at the duct, the element fit part being fitted with a filter element including a filter part configured to remove the paint mist and a filter case housing the filter part, the filter case having a case exit from which all air taken in from a case entrance of the filter case is caused to exit through the filter part; an frame-like projection projecting from an inner surface of the duct and abutting on an entire circumference of an opening edge of the case exit of the filter case; and a duct side-surface opening being open at a side surface of the duct and normally closed by a door member, the duct side-surface opening being open when the filter element is set in and out from the element fit part.

DETAILED DESCRIPTION OF PREFERRED EMBODIMENTS

First Embodiment

Figure 1:
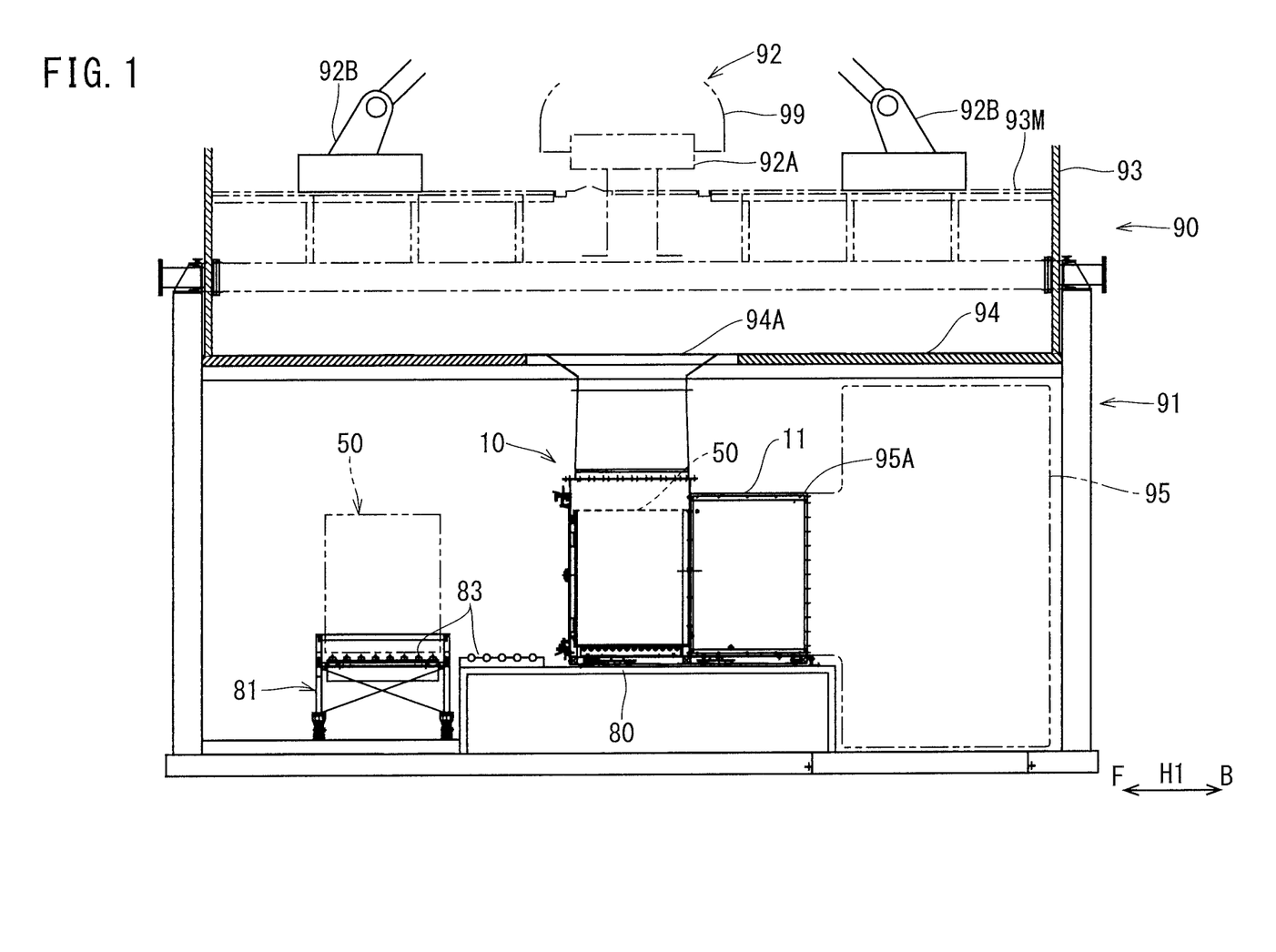
FIG. 1 is a sectional side view of a coating facility according to a first embodiment of the present disclosure.

Hereinafter, with reference to FIGS. 1 to 6, a description will be given of a paint mist removing apparatus 10 and a coating facility 90 according to a first embodiment of the present disclosure. FIG. 1 is a cross-sectional view of the coating facility 90 according to the present embodiment. The coating facility 90 includes a coating line 92 on a pedestal 91 which extends in the direction perpendicular to the paper surface of FIG. 1. The coating line 92 includes a plurality of coating robots 92B arranged on the both sides of a conveyance path 92A which extends in the direction perpendicular to the paper surface of FIG. 1. The coating robots 92B each include a coating gun for blowing paint mist to workpieces 99 (for example, automobile components) conveyed on the conveyance path 92A, to coat the workpieces 99.

The whole coating line 92 is covered with a coating booth 93. The opposite ends in the longitudinal direction of the coating booth 93 function as conveyance entrance/exit for the workpieces 99 and are closed by air curtains. The coating booth 93 is provided with a floor plate 93M of a mesh structure at a position higher than a bottom wall 94 of the coating booth 93. The coating booth 93 is provided with a not-illustrated ceiling plate of a mesh structure at a position lower than a not-illustrated upper surface wall of the coating booth 93. A ceiling wall also has a mesh structure, and has its upper surface laid with, for example, nonwoven fabric. Compressed air is supplied from the ceiling plate, and the air flows down through the entire ceiling wall. At a plurality of positions in the longitudinal direction of the bottom wall 94 (the direction perpendicular to the paper surface of FIG. 1), a plurality of discharge ports 94A are provided at the center in the width direction of the bottom wall 94. An exhaust duct 95 is connected to the discharge ports 94A via a plurality of paint mist removing apparatuses 10.

Specifically, the exhaust duct 95 extends for example, in parallel with the coating booth 93, and is disposed at a lower position on one side in the width direction of the coating booth 93. To the exhaust duct 95, a not-illustrated blower is connected to establish a negative pressure in the exhaust duct 95. At the center in its top-bottom direction, one side surface of the exhaust duct 95 oriented toward the center in the width direction of the coating booth 93 is provided with a plurality of connection ports 95A corresponding to the plurality of discharge ports 94A of the coating booth 93. On a mount 80 provided immediately below the center in the width direction of the coating booth 93, the plurality of paint mist removing apparatuses 10 are disposed. Ducts 11 of the paint mist removing apparatuses 10 connect between the discharge ports 94A of the coating booth 93 and the connection ports 95A of the exhaust duct 95. Thus, air containing paint mist that has failed to attach to the workpieces 99 is exhausted from the coating booth 93 to the paint mist removing apparatuses 10.

In this manner, in the coating facility 90 according to the present embodiment, to the coating booth 93 that covers the coating line 92, a plurality of paint mist removing apparatuses 10 are connected. Hereinafter, a detailed description will be given of the paint mist removing apparatus 10 defining that: the horizontal direction perpendicular to the exhaust duct 95 is the front-back direction H1; the direction in which one side surface where the connection ports 95A of the exhaust duct 95 are open is the front side F; and the side opposite to the front side F is the back side B.

Figure 2:
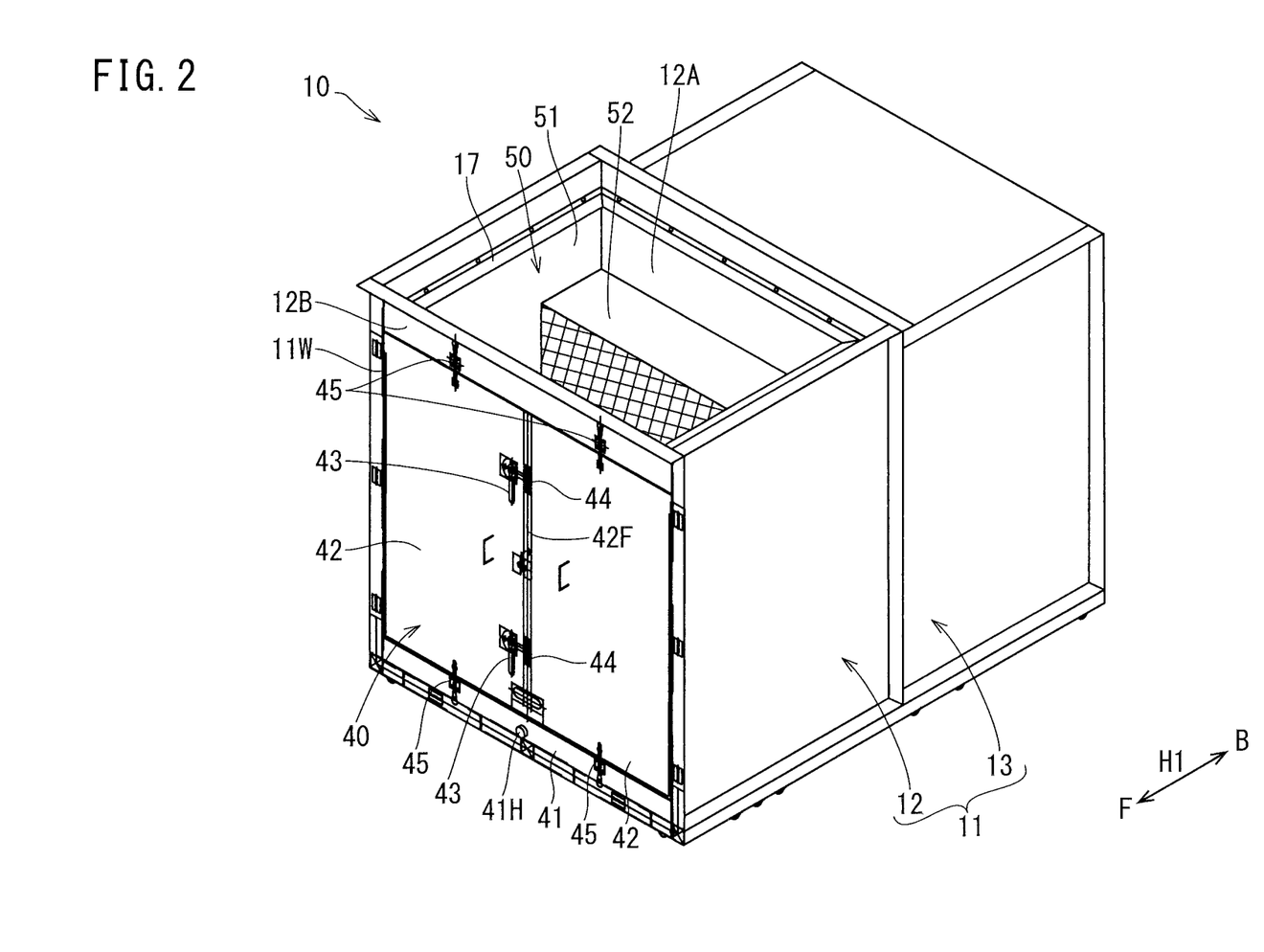
FIG. 2 is a perspective view of a paint mist removing apparatus.

As illustrated in FIG. 2, the duct 11 of each paint mist removing apparatus 10 is made up of; an upstream-side duct forming box 12 which is box-like having its upper side opened; and a downstream-side duct forming box 13 which has its front and back sides opened and which is connected to the upstream-side duct forming box 12. The upstream-side duct forming box 12 and the downstream-side duct forming box 13 have the same lateral width. The upstream-side duct forming box 12 is slightly greater in height than the downstream-side duct forming box 13. Onto substantially the entire back side wall 12A of the upstream-side duct forming box 12 (corresponding to "a first side wall" in the claims) excluding the upper end, the front side of the downstream-side duct forming box 13 is overlaid and fixed.

Figure 3:
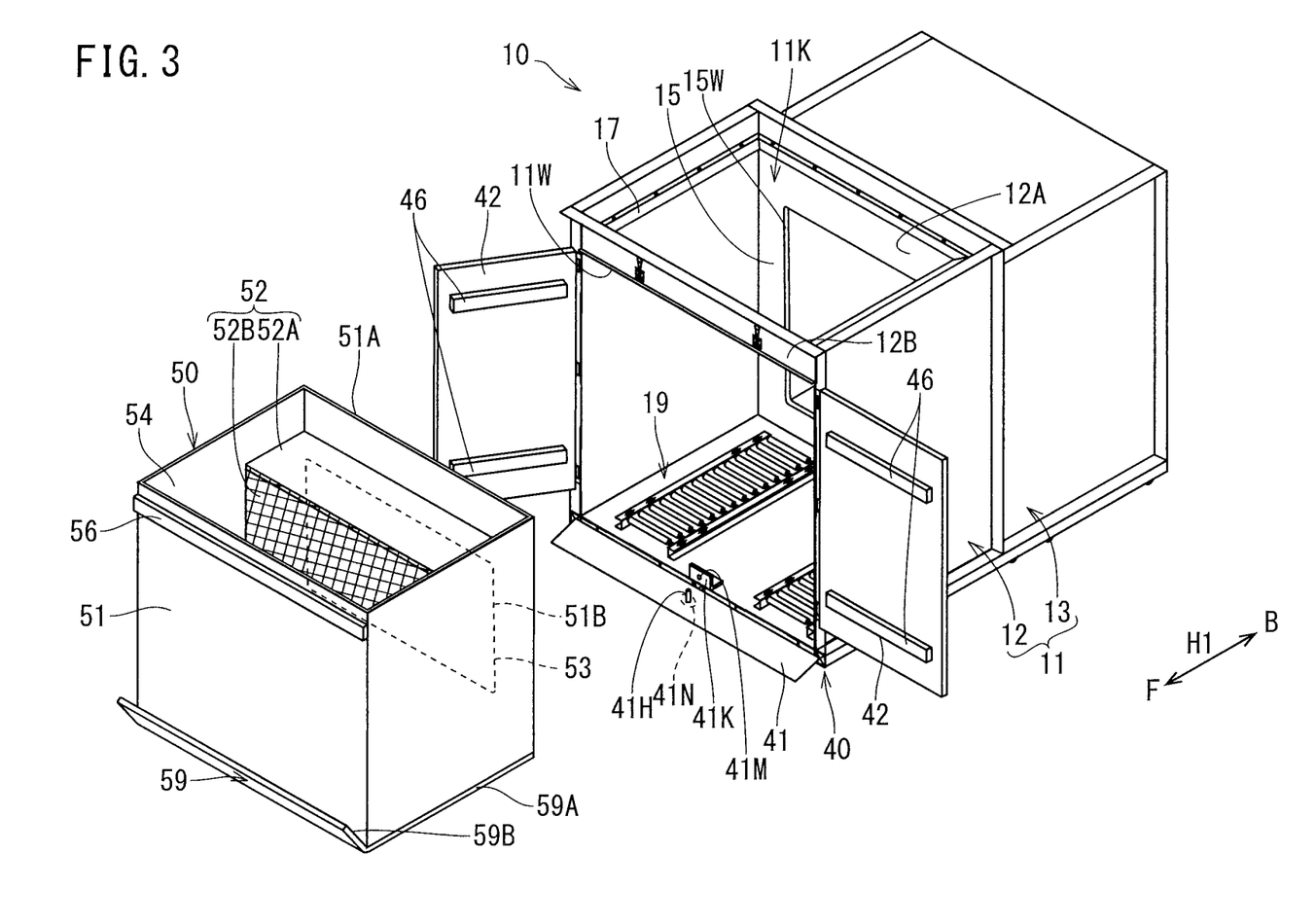
FIG. 3 is a perspective view of the paint mist removing apparatus without a filter element.

As illustrated in FIG. 3, the back side wall 12A of the upstream-side duct forming box 12 is provided with an opening 15W which is slightly smaller than the opening on the front side of the downstream-side duct forming box 13. The remaining portion around the opening 15W in the back side wall 12A forms an frame-like projection 15 which inwardly projects from the entire inner surface of the upstream-side duct forming box 12 in the duct 11.

In the upstream-side duct forming box 12, a duct side-surface opening 11W is formed at a front side wall 12B which is opposed to the frame-like projection 15. The duct side-surface opening 11W is obtained by cutting generally the front side wall 12B of the upstream-side duct forming box 12 to remove the range from the vicinity of the upper end to the lower end, slightly leaving the opposite side edges and the lower edge.

Note that, the upper opening edge of the duct side-surface opening 11W is positioned higher than the upper opening edge of the opening 15W on the inner side of the frame-like projection 15. The lower opening edge of the duct side-surface opening 11W is positioned lower than the lower opening edge of the opening 15W on the inner side of the frame-like projection 15.

The duct side-surface opening 11W is opened and closed by a door member 40 made up of a vertical rotational door 41 and a pair of horizontal rotational doors 42. The vertical rotational door 41 is horizontally elongated band-plate-like and coupled by a hinge to the lower side part of the opening edge of the duct side-surface opening 11W, to close the lower end of the duct side-surface opening 11W. The pair of horizontal rotational doors 42 are coupled by hinges to the opposite side edges of the opening edge of the duct side-surface opening 11W, to respectively close the halves of the whole duct side-surface opening 11W excluding the lower end.

From the center of the front edge of the lower surface in the upstream-side duct forming box 12, a stopper piece 41K stands upright. The vertical rotational door 41 in the closed state and the stopper piece 41K overlap with each other. A screw hole 41M is formed at the stopper piece 41K. Corresponding to the screw hole 41M, a screwing operation component 41H which includes a bolt 41N provided with an operation part at its one end is rotatably held at the vertical rotational door 41. With the vertical rotational door 41 being in the closed state, by the bolt 41N of the screwing operation component 41H being screwed with the screw hole 41M of the stopper piece 41K, the vertical rotational door 41 maintains its the closed state.

Figure 4:
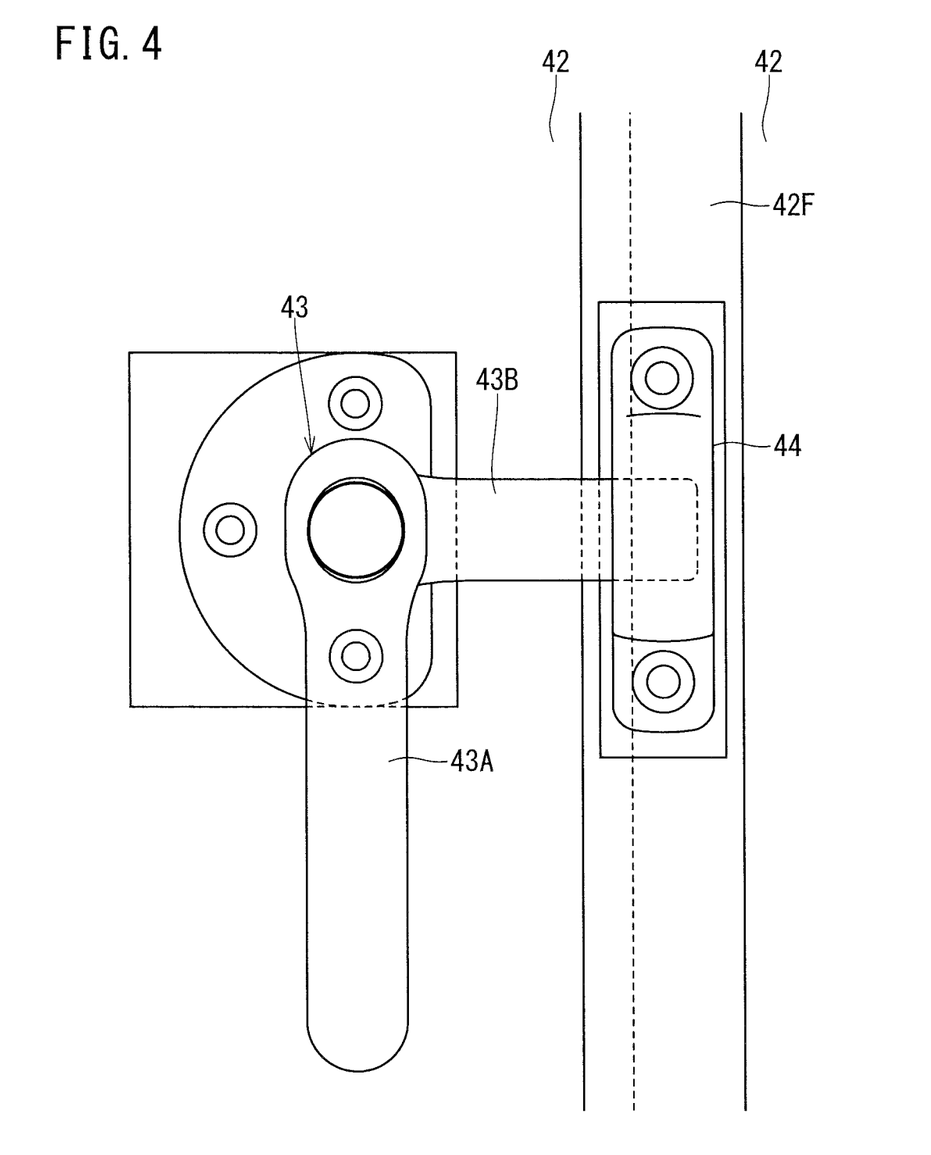
FIG. 4 is a front view of a lock lever.

As illustrated in FIG. 2, at its tip, one horizontal rotational door 42 is provided with a gap cover plate 42F which overlaps with the tip of the other horizontal rotational door 42 from the front side. At two positions in the longitudinal direction on the outer surface of the gap cover plate 42F, hooks 44 illustrated in FIG. 4 are provided in a pair. The pair of hooks 44 are each formed of a band-like-plate which projects frontward from the gap cover plate 42F and is bent downward at the right angle.

As illustrated in FIG. 2, at the front surface of the horizontal rotational door 42 not provided with the pair of hooks 44, a pair of lock levers 43 is provided corresponding to the pair of hooks 44. As illustrated in FIG. 4, each lock lever 43 is rotatably held relative to the horizontal rotational door 42, and includes an operation bar 43A and an action bar 43B that extend substantially parallel to the front surface of the horizontal rotational door 42. By the lock lever 43 being rotated by an operation on the operation bar 43A to cause the action bar 43B to enter inside the hook 44, the pair of horizontal rotational doors 42 is locked in the closed state.

Figure 5:
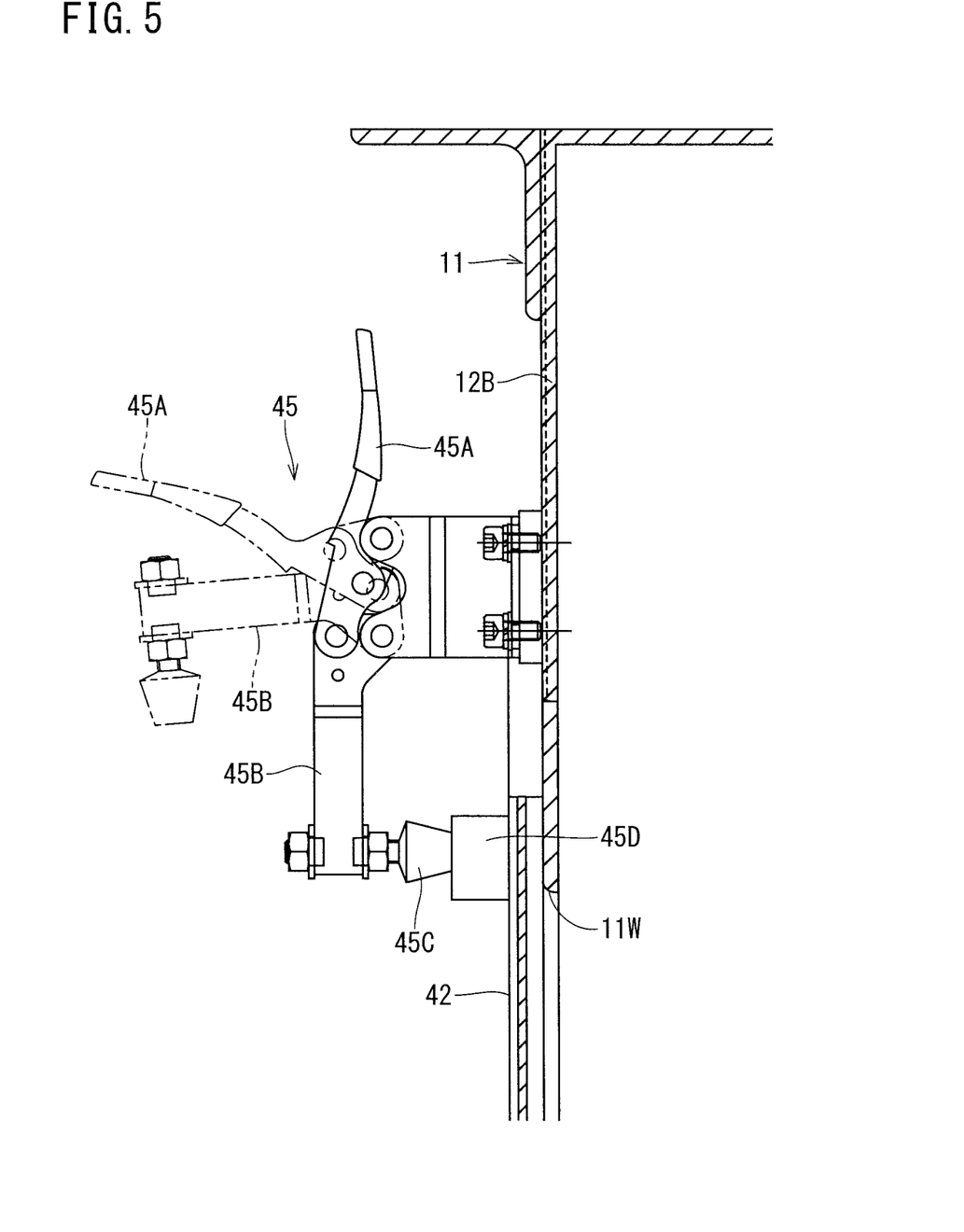
FIG. 5 is a side view of a toggle clamp.

As illustrated in FIG. 2, a toggle clamp 45 is provided at each of two positions in the horizontal direction in the upper opening edge of the duct side-surface opening 11W on the front surface of the upstream-side duct forming box 12 and two positions in the horizontal direction on the front surface of the vertical rotational door 41. As illustrated in FIG. 5, the toggle clamp 45 includes an operation bar 45A and an action bar 45B that rotate about the rotation axis extending in the horizontal direction of the duct 11, and a toggle mechanism coupling between the operation bar 45A and the action bar 45B. By rotationally operating the operation bar 45A, a pushed member 45D projecting from the front surface of the horizontal rotational door 42 is pushed by a pushing member 45C at the tip of the action bar 45B, thereby regulating the rotation of the horizontal rotational door 42 in the closed state.

Figure 6:
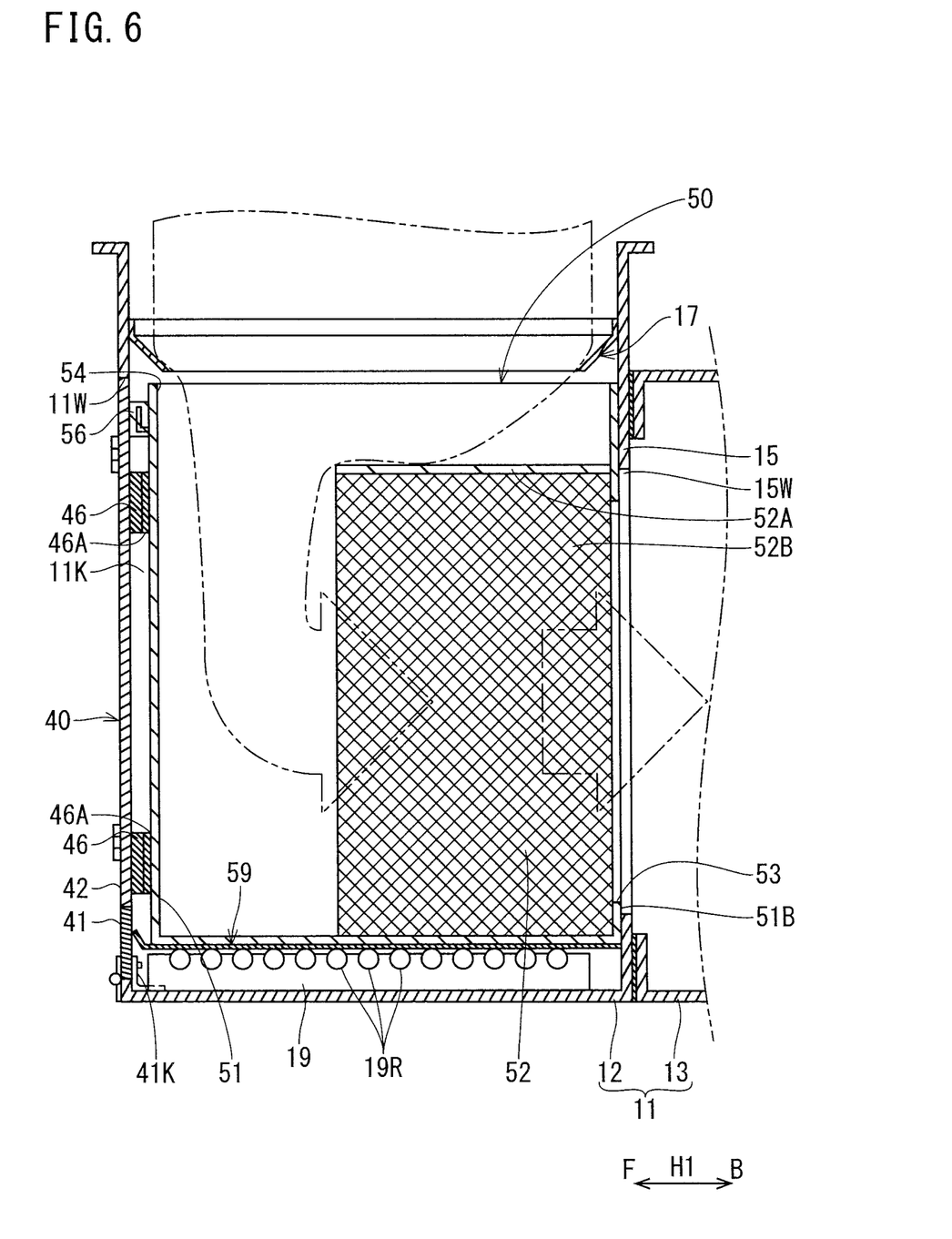
FIG. 6 is a sectional side view of the paint mist removing apparatus.

As illustrated in FIG. 3, at the back surface of each horizontal rotational door 42, an element pushing part 46 is provided at each of two positions, namely, the vicinity of the upper end and the vicinity of the lower end. Each element pushing part 46 is, for example, band-plate-like extending in the horizontal direction. As illustrated in FIG. 6, each element pushing part 46 has its back surface covered with an elastic member 46A (for example, a urethane foam sheet).

As illustrated in FIG. 3, on the lower surface of the upstream-side duct forming box 12, a pair of roller conveyors 19 extending in the front-back direction is mounted. As illustrated in FIG. 6, a shared contact surface where the plurality of rollers 19R of the roller conveyors 19 are brought into contact from above is positioned higher than the stopper piece 41K and lower than the lower opening edge of the opening 15W on the inner side of the frame-like projection 15.

In the upstream-side duct forming box 12, on a portion higher than the duct side-surface opening 11W, an frame-like overhang part 17 is mounted. The frame-like overhang part 17 is frame-like and has a funnel structure, overhanging from the inner surface of the upstream-side duct forming box 12 and shrinking diagonally inward and downward toward its tip side. Specifically, in the frame-like overhang part 17, the sides disposed on the inner surfaces of the upstream-side duct forming box 12 are formed by: folding band-like-plates, which horizontally extend and have their width direction oriented in the top-bottom direction, at a substantially obtuse angle at a midway position in the top-bottom direction; and overlaying and fixing the portion higher than the folded part on the inner surfaces of the upstream-side duct forming box 12.

In the upstream-side duct forming box 12, the site between the frame-like overhang part 17 and the roller conveyors 19 is an element fit part 11K where a filter element 50 is fitted through a duct side-surface opening 11W. As illustrated in FIG. 3, the filter element 50 includes a rectangular parallelepiped-shaped filter case 51 and a filter part 52 housed in the filter case 51. The whole filter element 50 is formed of, for example, corrugated cardboards, and can be incinerated.

Specifically, the filter case 51 has a shape of a rectangular parallelepiped to be fitted into the upstream-side duct forming box 12, and includes a case entrance 54 which is open on the entire upper side of the filter case 51 and a case exit 53 which is open at part of the back side. The case exit 53 is disposed at the lower part in the back side of the filter case 51, and has a quadrangular shape which is slightly smaller than the opening 15W on the inner side of the frame-like projection 15. All the air having flowed into the filter case 51 from the case entrance 54 is exhausted from the case exit 53.

The filter part 52 is formed of a ceiling wall 52A and a filter body 52B, and covers the whole case exit 53 from the inside of the filter case 51. Specifically, the ceiling wall 52A is formed of a corrugated cardboard which has a shape obtained by dividing a quadrangle, which is the shape of the inner horizontal cross-sectional shape of the filter case 51, into front and back halves. The ceiling wall 52A is disposed on the back side in the filter case 51 and has its three sides connected to the inner surface of the filter case 51.

Furthermore, the filter body 52B is formed of, for example, a plurality of corrugated cardboards having their upper and lower both ends respectively connected to the ceiling wall 52A and the bottom surface of the filter case 51. By the plurality of corrugated cardboards being folded into a wavy shape so that the mountains and valleys are repeatedly formed in the front-back direction, meandering channels are provided among the plurality of corrugated cardboards.

In the filter case 51, a handle part 56 projects from the vicinity of the upper end on the front surface. The handle part 56 is obtained by bonding a horizontally elongated plate-like folded corrugated cardboard onto the outer surface of the filter case 51.

The filter element 50 is placed on the tray 59 in use. The tray 59 includes a flat plate part 59A which has the same size as the lower surface of the filter element 50 and an inclined part 59B which is bent diagonally upward from the front edge of the flat plate part 59A.

The foregoing is the structure of the paint mist removing apparatus 10 and the coating facility 90 according to the present embodiment. Next, a description will be given of the operation and effect of the present embodiment.

The paint mist removing apparatus 10 is used having the filter element 50 replaced as appropriate. Setting the filter element 50 to the paint mist removing apparatus 10 is performed while the coating facility 90 is stopped. A new filter element 50 placed on the tray 59 is, for example as illustrated in FIG. 1, loaded on a dolly 81 which is as high as the mount 80 and transferred to the front vicinity of the paint mist removing apparatus 10. Then, with the door member 40 of the paint mist removing apparatus 10 being open, the filter element 50 is shifted to the front vicinity of the paint mist removing apparatus 10 in the upper surface of the mount 80. From there, the filter element 50 is fitted with the element fit part 11K of the duct 11 through the duct side-surface opening 11W of the paint mist removing apparatus 10. Here, for example, when a roller conveyor 83 is installed at each of the upper surface of the dolly 81 and the front vicinity of the paint mist removing apparatus 10 in the upper surface of the mount 80, the filter element 50 is easily shifted between the dolly 81 and the paint mist removing apparatus 10. Furthermore, since the filter element 50 is placed on the tray 59, the filter element 50 smoothly shifts on the roller conveyor 83. Furthermore, in the paint mist removing apparatus 10 according to the present embodiment, since the door member 40 is implemented by a plurality of elements, namely, the vertical rotational door 41 and a pair of horizontal rotational doors 42, the movable range of the door member 40 is compact. This reduces the risk of interference between the sites around the paint mist removing apparatus 10 and the door member 40.

When the filter element 50 fits with the element fit part 11K, the door member 40 is closed. Then, as illustrated in FIG. 6, the filter element 50 is pushed by the element pushing part 46 of the pair of horizontal rotational doors 42 of the door member 40, and the frame-like projection 15 abuts on the entire circumference of the opening edge of the case exit 53 in the filter element 50. Thus, the whole case exit 53 is opposed to the opening 15W on the inner side of the frame-like projection 15. Furthermore, even when the pair of horizontal rotational doors 42 is pushed back by the filter element 50, the toggle clamp 45 (see FIG. 5) allows the horizontal rotational doors 42 to easily be closed. Then, the lock lever 43 (see FIG. 4) can lock the pair of horizontal rotational doors 42 in the closed state. Furthermore, the gap between the side surface of the filter element 50 and the inner surface of the duct 11 is closed by the frame-like overhang part 17 from above (upstream to the duct 11).

When the filter element 50 is set in the paint mist removing apparatus 10 through the foregoing work, the coating facility 90 operates and air containing paint mist flows from the coating booth 93 into the duct 11 of the paint mist removing apparatus 10. The air flows from the case entrance 54 of the filter element 50 in the duct 11 into the filter case 51. Then, all the air having flowed into the filter case 51 is exhausted from the case exit 53. Through this course, the air containing paint mist passes through a plurality of meandering channels in the filter part 52, and the paint mist hits and attaches to the inner surface of the filter part 52.

Furthermore, in the present embodiment, as illustrated in FIG. 6, the case entrance 54 of the filter element 50 is substantially displaced in the upper surface of the filter case 51 toward the side away from the case exit 53. Thus, the air flows in a right angle in the filter case 51, causing the paint to attach to the inner surface or substantially the upper surface of the filter case 51 (specifically, the upper surface of the filter part 52), in addition to the filter part 52. Thus, the paint mist is removed from the air.

On the other hand, the gap between the filter element 50 and the duct 11 (specifically, the gap between the outer surface of the filter case 51 and the inner surface of the upstream-side duct forming box 12) forms a dead end where the air is stagnated. Therefore, the air containing paint mist is suppressed from flowing into the gap. Furthermore, the frame-like overhang part 17 overhangs the gap from the upstream side. This also contributes to suppressing the air containing paint mist from flowing into the gap and preventing the paint mist from attaching to the outer surface of the filter case 51.

When the amount of the paint mist attached to the filter element 50 has reached to a reference value, the filter element 50 is replaced by a new filter element 50. Note that, the amount of the paint mist attached to the filter element 50 may be detected by: providing a scale in the paint mist removing apparatus 10 and obtaining any change in weight of the filter element 50; or estimating from the use hours of the filter element 50 or the volume of air having passed through the filter element 50. Alternatively, the amount of the paint mist attached to the filter element 50 may be estimated by: providing a pressure sensor in the paint mist removing apparatus 10 and based on the difference in air pressure of the air before and after passing through the filter element 50.

Replacing the filter element 50 is performed as follows: in the state where the coating facility 90 is stopped, firstly, dispose an unloaded dolly 81 on the front side of the paint mist removing apparatus 10; dispose a dolly 81 loaded with a new filter element 50 next to the unloaded dolly 81; open the door member 40 of the paint mist removing apparatus 10; grab, for example, the handle part 56 of the filter element 50 and pull out the filter element 50 from the duct 11; and place the filter element 50 on the dolly 81.

That is, with the paint mist removing apparatus 10 according to the present embodiment, while the filter part 52 to which paint mist is attached is kept being housed in the filter case 51, the used filter element 50 can be taken out from the duct 11 and transferred. This prevents scattering of the paint. Then, setting the new filter element 50 in the duct 11 through the same operation as described above will complete the replacing the filter element 50. The used filter element 50 may be, for example, transferred to an incineration facility where the filter element 50 is unloaded from the tray 59 and incinerated.

As has been described above, the filter element 50 used with the paint mist removing apparatus 10 according to the present embodiment includes the filter case 51 and the filter part 52 housed in the filter case 51. The duct 11 of the paint mist removing apparatus 10 is provided with the frame-like projection 15 which abuts on the entire circumference of the opening edge of the case exit 53 of the filter case 51 from which all the air having flowed into the filter case 51 is exhausted. Thus, substantially all the air containing paint mist passes through the inside of the filter case 51; the paint mist is suppressed from attaching to the outer surface of the filter case 51; and the paint mist is collected by the filter part 52 in the filter case 51. While the filter part 52 to which paint mist is attached is kept being housed in the filter case 51, the used filter element 50 is taken out from the duct 11 and replaced with a new filter element 50. This prevents scattering of the paint during the filter replacement work. That is, the paint mist removing apparatus 10 of the present disclosure facilitates the filter replacement work than the conventional technique. Furthermore, the fluid pressure of air passing through the inside of the filter case 51 presses the filter case 51 against the frame-like projection 15. That is, the filter element 50 is set inside the duct 11 using the simple structure. In this regard also, the filter replacement work is facilitated than the conventional technique.

Second Embodiment

Figure 7:
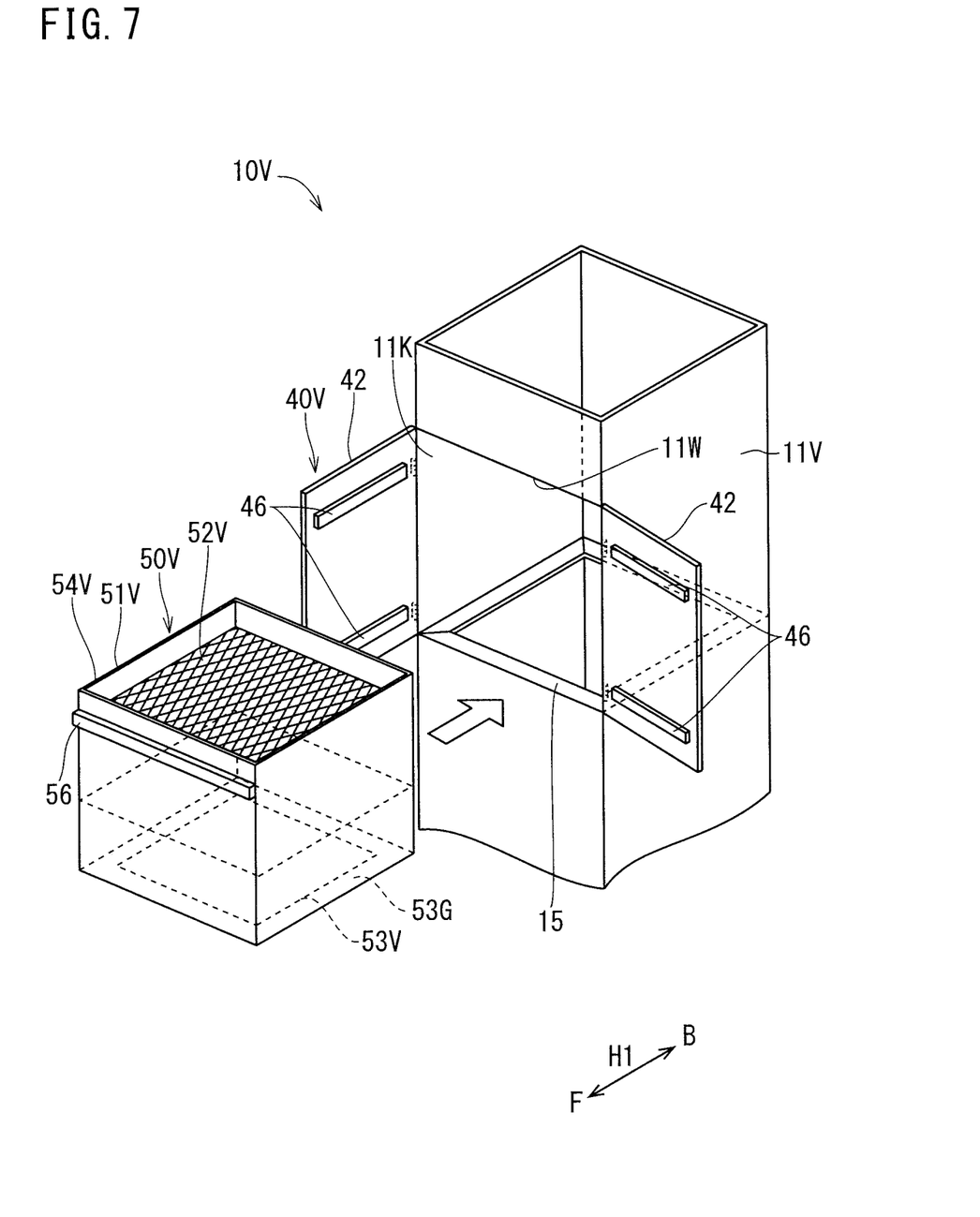
FIG. 7 is a perspective view of a paint mist removing apparatus according to a second embodiment.
Figure 8:
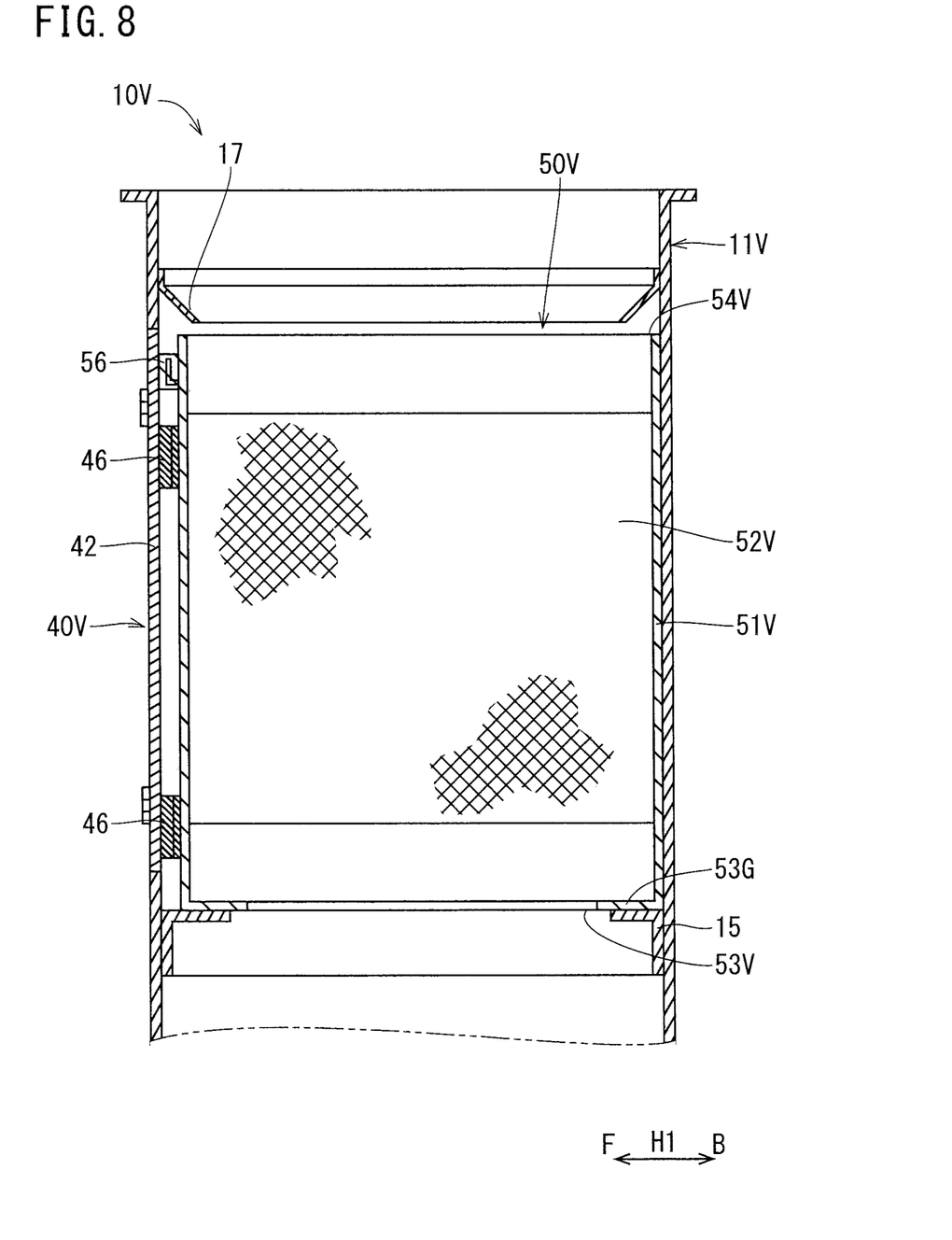
FIG. 8 is a sectional side view of the paint mist removing apparatus.

FIGS. 7 and 8 illustrate a paint mist removing apparatus 10V according to the present embodiment. As illustrated in FIG. 7, a duct 11V of the paint mist removing apparatus 10V according to the present embodiment has a quadrangular cross-sectional shape and extends in the top-bottom direction. The duct 11V has its intermediate portion in its longitudinal direction cut off by substantially the entire width length, to form a quadrangular duct side-surface opening 11W at its one side surface. At the lower end of the duct side-surface opening 11W, an frame-like projection 15 is formed to project from the inner surface of the duct 11V. The duct side-surface opening 11W is opened and closed by a door member 40V made up of a pair of horizontal rotational doors 42.

The filter element 50V includes a case entrance 54V which is open on the entire upper side of the filter case 51V. The filter case 51V includes a frame-shaped wall 53G at the outer edge of its lower surface. The inner side of the frame-shaped wall 53G forms a case exit 53V. The filter part 52V is disposed from the vicinity of the upper end to the vicinity of the lower end of the filter case 51. The filter part 52V is formed of, for example, a plurality of corrugated cardboards arranged in the horizontal direction so as to be spaced away from each other. The corrugated cardboards are each folded into a wavy shape so that the mountains and valleys are repeatedly formed in the top-bottom direction.

Note that, on the front side of the duct side-surface opening 11W, a not-illustrated mount is provided. On the mount, a roller conveyor is installed. The upper surface of the roller conveyor and the upper surface of the frame-like projection 15 are substantially flush with each other. As to the rest of the structures according to the second embodiment, those elements identical to the first embodiment are denoted by the identical reference character and a detailed description thereof is not repeated.

As illustrated in FIG. 8, in the paint mist removing apparatus 10V according to the present embodiment also, the frame-like projection 15 abuts on the entire circumference of the opening edge of the case exit 53V, and substantially all the air containing paint mist passes through the inside of the filter case 51V. This provides the effect similar to that attained by the paint mist removing apparatus 10 according to the first embodiment.

Note that, the filter element 50V according to the present embodiment may be placed and transferred on a not-illustrated tray in which the flat plate part 59A of the tray 59 according to the first embodiment is modified to have the frame shape identical to the frame-shaped wall 53G. Furthermore, for example, the tray may have a double-plate structure in which a flat plate part having the frame shape identical to the frame-shaped wall 53G is opposingly arranged above the flat plate part with a clearance. In transferring the used filter element 50V, a lid plate may be inserted into the clearance, to receive the paint dripping from the filter element 50V.

The duct 11V may be elongated in the horizontal direction. The duct side-surface opening 11W may be formed at its upper or lower surface or its one side surface between the upper surface and the lower surface, for the filter element 50V to be set in or removed. In the case where the duct side-surface opening 11W is provided at the lower surface of the duct 11V, the door member of the duct side-surface opening 11W is preferably provided with a lift mechanism on which the filter element 50V is placed and elevated or lowered.

Third Embodiment

Figure 9:
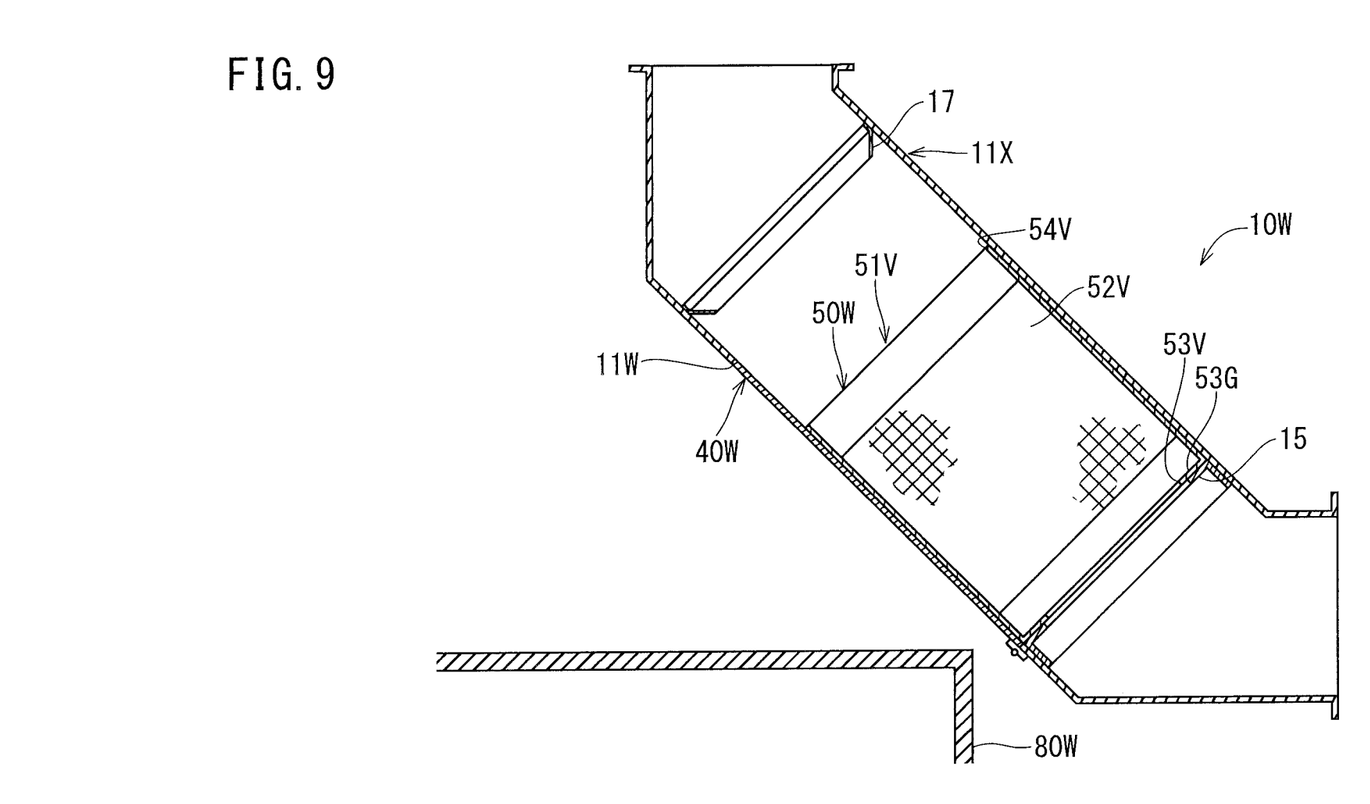
FIG. 9 is a sectional side view of a paint mist removing apparatus according to a third embodiment.
Figure 10:
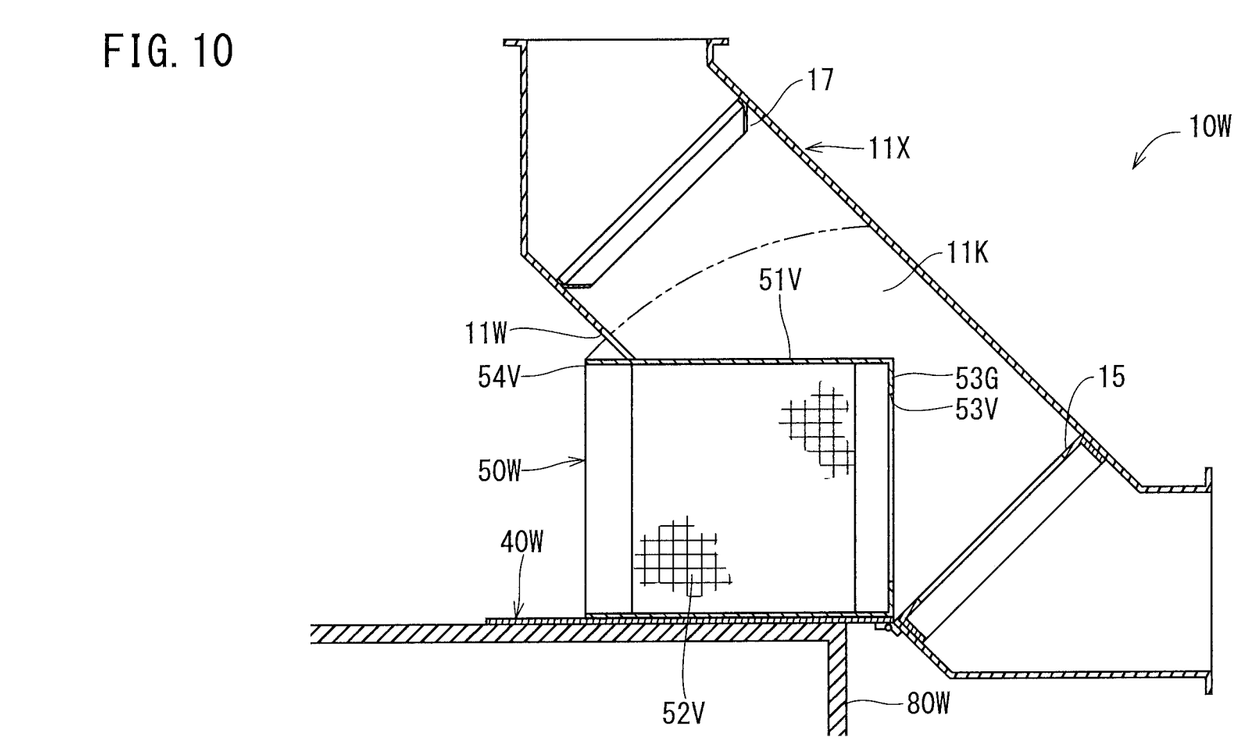
FIG. 10 is a sectional side view of the paint mist removing apparatus without a filter element.

FIGS. 9 and 10 illustrate a paint mist removing apparatus 10W according to the present embodiment. As illustrated in FIG. 9, the paint mist removing apparatus 10W according to the present embodiment includes a duct 11X which inclinedly extends relative to the top-bottom direction. The duct 11X has its intermediate portion in its longitudinal direction cut off by substantially the entire width length, to form a quadrangular duct side-surface opening 11W at its one side surface oriented diagonally downward. At the lower end of the duct side-surface opening 11W, an frame-like projection 15 is formed to project from the inner surface of the duct 11V.

To the lower edge of the duct side-surface opening 11W, a door member 40W is coupled by a hinge. Below the duct side-surface opening 11W, a mount 80W which is brought into abutment at the open position where the door member 40W becomes horizontal is provided. The door member 40W is rotated between the open position and the closed position by, for example, a not-illustrated motor or air cylinder. At its opening edge, the duct side-surface opening 11W is provided with a not-illustrated lock lever for fixing the door member 40W to the closed position.

The filter element 50W according to the present embodiment corresponds to the filter element 50V according to the second embodiment without the handle part 56. As illustrated in FIG. 10, the filter element 50V is placed on the door member 40W of the open position having the case entrance 54V and the case exit 53V oriented in the horizontal direction. When the door member 40W is rotated to reach the closed position, as illustrated in FIG. 9, the frame-like projection 15 abuts on the entire circumference of the opening edge of the case exit 53V.

The present embodiment also exhibits the operation and effect similar to those attained by the first and second embodiments. Note that, roller casters may be provided to the inner surface of the door member 40W and the upper surface of the mount 80W.

Other Embodiment (1) While the filter elements 50, 50V, 50W according to the first to third embodiments are disposable, they may be partially or entirely reused. When any of the filter elements is disposable, it may be preferably partially or entirely made of paper or resin taking into consideration of incineration. Furthermore, when the filter element which is partially or entirely reused has its reused part made of metal, the paint can be rinsed off with ease. When the filter element is made of paper or the like, as in the present embodiment, the filter element is preferably placed on a tray in use for reinforcement.

(2) While the ducts 11, 11V, 11X and the filter elements 50, 50V, 50W according to the first to third embodiments each have a quadrangular cross-sectional shape, each duct and each filter element may have any cross-sectional shape so long as they fit with each other. Specifically, the cross-sectional shape of the duct and the filter element may be, for example, a circle, an oval, or a triangle.

(3) The filter part 52 of the filter element 50 according to the first embodiment includes meandering channels formed of a plurality of wavy corrugated cardboards which are juxtaposed to one another. Here, for example, the meandering channels may be obtained by a plurality of plate-like corrugated cardboards which are staggered. Alternatively, the meandering channels may be obtained by a plurality of corrugated cardboards provided with a plurality of through holes which are arranged so as to be spaced apart from each other between the case entrance 54 and the case exit 53 of the filter case 51, in which the through holes are displaced from each other so as not to be opposed to each other in the arrangement direction. Furthermore, the filter part 52 is not specified to include the meandering channels. For example, the filter part 52 may include mesh-structure opposing walls between which nonwoven fabric or shredded paper fluff is set.

(4) The frame-like overhang part 17 according to the first embodiment overhang the gap between the filter element 50 and the duct 11 from above. Here, the frame-like overhang part 17 may overhang part of the gap on the duct 11 side. Furthermore, while the frame-like overhang part 17 has a funnel structure, the frame-like overhang part 17 may overhang the duct 11 at the right angle. The frame-like overhang part 17 may be dispensed with.

(5) While the door members 40, 40V, 40W according to the first to third embodiments rotatably operate, they may slidably operate.

(6) The paint mist removing apparatuses 10, 10V, 10W according to the first to third embodiments respectively include the filter elements 50, 50V, 50W as a filter. Here, they may include a filter in addition to the filter elements 50, 50V, 50W. Specifically, a conventional filter not housed in the filter case may be provided downstream to the filter elements 50, 50V, 50W of the paint mist removing apparatuses 10, 10V, 10W according to the first to third embodiments. This structure reduces the frequency of replacing the filter not housed in the filter case than the conventional technique. Accordingly, the filter replacement work efficiency improves.

(7) In the first to third embodiments, as to the frame-like projection 15 and the opening edge of each case exit 53, 53V abutting on each other, plate-like wall parts are overlaid on each other in their thickness direction. Here, from one of the frame-like projection 15 and the opening edge of the case exit 53, 53V, an frame-like rib may be projected to abut on the other. Furthermore, to one of the frame-like projection 15 and the opening edge of the case exit 53, 53V, a gasket made of, for example, resin foam or rubber may be provided.

(8) The duct 11 of the paint mist removing apparatus 10 according to the first embodiment is bent so as to direct the air flowing vertically downward toward the horizontal direction. Here, the duct 11 may be bent so as to direct the air flowing vertically upward toward the horizontal direction, or to direct the air flowing in the first horizontal direction toward the second horizontal direction perpendicular to the first horizontal direction.

What is claimed is:

1. A paint mist removing apparatus comprising:
a duct through which air containing paint mist passes;
an element fit part provided at the duct and housing a filter element, the filter element including a filter part configured to remove the paint mist and a filter case housing the filter part, the filter case having a case exit from which all air taken in from a case entrance of the filter case is caused to exit through the filter part;
a frame projection projecting from an inner surface of the duct and abutting on an entire circumference of an opening edge of the case exit of the filter case;
a duct side-surface opening and a door, the duct side-surface opening being open at a side surface of the duct and configured to be closed by the door, the duct side-surface opening being open when the filter element is set in and out from the element fit part in a direction through the duct side-surface opening; and
an overhang extending from the inner surface of the duct at a position upstream of the filter element with respect to a direction of air flow through the duct so that the overhang covers a gap between the filter element and the duct, the overhang having a frame including side walls that extend from the inner surface of the duct in an inward direction that is inclined in a direction towards the filter element so that a width dimension of the overhang narrows in the direction towards the filter element.

2. The paint mist removing apparatus according to claim 1, wherein
the duct includes an upstream-side duct forming box including an upper side that is open and a downstream-side duct forming box having a whole one side surface overlaid and fixed onto a one side wall of the upstream-side duct forming box excluding an upper end of the one side wall of the upstream-side duct forming box,
the one side surface and an entire side surface opposed to the one side surface are open,
at the one side wall, an opening smaller than the one side surface of the downstream-side duct forming box is formed, the one side wall remaining around the opening forming the frame projection,
the duct side-surface opening is located at a position opposed to the one side wall of the upstream-side duct forming box, and
the filter case has a shape of a rectangular parallelepiped to be fitted into the upstream-side duct forming box and includes the case entrance at an upper surface of the filter case and includes the case exit at a side surface of the filter case.

3. The paint mist removing apparatus according to claim 2, wherein the filter part is overlaid on a first side wall including the case exit in the filter case and disposed with a space between the filter part and a second side wall that is opposed to the first side wall in the filter case, to take in air only from a portion opposed to the second side wall in the filter part.

4. The paint mist removing apparatus according to claim 2, wherein
the door is coupled by a hinge to an opening edge of the duct side-surface opening, and
at an inner surface of the door, an element pushing part configured to push the filter element toward the frame projection is provided.

5. The paint mist removing apparatus according to claim 3, wherein
the door is coupled by a hinge to an opening edge of the duct side-surface opening, and
at an inner surface of the door, an element pushing part configured to push the filter element toward the frame projection is provided.

6. The paint mist removing apparatus according to claim 2, wherein on an inner lower surface of the upstream-side duct forming box, a roller conveyor configured to convey the filter element is installed.

7. The paint mist removing apparatus according to claim 3, wherein on an inner lower surface of the upstream-side duct forming box, a roller conveyor configured to convey the filter element is installed.

8. The paint mist removing apparatus according to claim 4, wherein on an inner lower surface of the upstream-side duct forming box, a roller conveyor configured to convey the filter element is installed.

9. The paint mist removing apparatus according to claim 2, wherein
the duct side-surface opening is formed at a surface in the duct opposed to the frame projection, and
the door includes
a vertical rotational door having a horizontally elongated band-plate shape and coupled by a hinge to a lower side part of an opening edge of the duct side-surface opening to close a lower end of the duct side-surface opening, and
a pair of horizontal rotational doors coupled by a hinge to opposite side edges of the opening edge of the duct side-surface opening, the horizontal rotational doors respectively closing halves of a whole of the duct side-surface opening excluding the lower end.

10. The paint mist removing apparatus according to claim 3, wherein
the duct side-surface opening is formed at a surface in the duct opposed to the frame projection, and
the door includes
a vertical rotational door having a horizontally elongated band-plate shape and coupled by a hinge to a lower side part of an opening edge of the duct side-surface opening to close a lower end of the duct side-surface opening, and
a pair of horizontal rotational doors coupled by a hinge to opposite side edges of the opening edge of the duct side-surface opening, the horizontal rotational doors respectively closing halves of a whole of the duct side-surface opening excluding the lower end.

11. The paint mist removing apparatus according to claim 4, wherein
the duct side-surface opening is formed at a surface in the duct opposed to the rame frame projection, and
the door includes
a vertical rotational door having a horizontally elongated band-plate shape and coupled by a hinge to a lower side part of an opening edge of the duct side-surface opening to close a lower end of the duct side-surface opening, and
a pair of horizontal rotational doors coupled by a hinge to opposite side edges of the opening edge of the duct side-surface opening, the horizontal rotational doors respectively closing halves of a whole of the duct side-surface opening excluding the lower end.

12. The paint mist removing apparatus according to claim 1, wherein the element fit part completely encases the filter element except at a surface with the case entrance and at a surface with the case exit.

13. The paint mist removing apparatus according to claim 1, wherein
the side walls of the overhang are inclined with respect to a vertical direction, and the vertical direction is orthogonal to the direction through the duct side-surface opening.

14. The paint mist removing apparatus according to claim 13, wherein the width direction of the overhang is transverse to the vertical direction.

15. The paint mist removing apparatus according to claim 1, wherein a perimeter of the overhang narrows in the direction towards the filter element.

16. A coating facility comprising:
a coating booth covering a coating line;
the paint mist removing apparatus according to claim 2, wherein a plurality of paint mist removing apparatuses are connected to the coating booth from below respectively at a plurality of positions in a longitudinal direction of the coating line, and air containing paint mist flows into the plurality of paint mist removing apparatuses from the coating booth; and
an exhaust duct extending in parallel with the coating line, wherein a downstream-side end of the duct of each of the plurality of paint mist removing apparatuses is connected to the exhaust duct.

17. A coating facility comprising:
a coating booth covering a coating line;
the paint mist removing apparatus according to claim 3, wherein a plurality of paint mist removing apparatuses are connected to the coating booth from below respectively at a plurality of positions in a longitudinal direction of the coating line, and air containing paint mist flows into the plurality of paint mist removing apparatuses from the coating booth; and
an exhaust duct extending in parallel with the coating line, wherein a downstream-side end of the duct of each of the plurality of paint mist removing apparatuses is connected to the exhaust duct.

18. A coating facility comprising:
a coating booth covering a coating line;
the paint mist removing apparatus according to claim 4, wherein a plurality of paint mist removing apparatuses are connected to the coating booth from below respectively at a plurality of positions in a longitudinal direction of the coating line, and air containing paint mist flows into the plurality of paint mist removing apparatuses from the coating booth; and
an exhaust duct extending in parallel with the coating line, wherein a downstream-side end of the duct of each of the plurality of paint mist removing apparatuses is connected to the exhaust duct.

\* \* \* \* \*